United States Patent [19]
Sakurai

[11] 3,895,617
[45] July 22, 1975

[54] INTAKE MANIFOLD DEVICE OF AN INTERNAL COMBUSTION ENGINE

[75] Inventor: Yoshitoshi Sakurai, Kawasaki, Japan

[73] Assignee: Honda Giken Kogyo Kabushiki Kaisha, Tokyo, Japan

[22] Filed: June 22, 1973

[21] Appl. No.: 372,764

[30] Foreign Application Priority Data
June 28, 1972 Japan.............................. 47-76220

[52] U.S. Cl...... 123/122 AB; 123/75 B; 123/32 SP; 165/52
[51] Int. Cl...................... F02b 19/10; F02b 19/18
[58] Field of Search... 123/122 A, 122 AB, 122 AC, 123/75 B, 52 M, 32 ST, 32 SPA; 165/52

[56] References Cited
UNITED STATES PATENTS

| | | | |
|---|---|---|---|
| 2,121,921 | 6/1938 | Mallory............................ | 123/75 B |
| 2,244,214 | 6/1941 | Pescara............................. | 123/75 B |
| 2,686,506 | 8/1954 | Carpentier....................... | 123/122 A |
| 3,659,564 | 5/1972 | Suzuki............................. | 123/325 T |
| 3,717,131 | 2/1973 | Chana............................. | 123/122 AB |

Primary Examiner—Charles J. Myhre
Assistant Examiner—Ronald B. Cox
Attorney, Agent, or Firm—Lyon & Lyon

[57] ABSTRACT

An intake manifold arrangement for controlling the relative temperatures of a rich intake mixture and a lean intake mixture in a reciprocating, internal combustion engine which includes a main combustion chamber and an auxiliary combustion chamber. Heat exchange is effected between the rich intake mixture and the lean intake mixture to insure proper relative temperatures between the rich and lean mixtures. This arrangement reduces the effect which variations in temperature have on the ratio of intake components.

2 Claims, 2 Drawing Figures

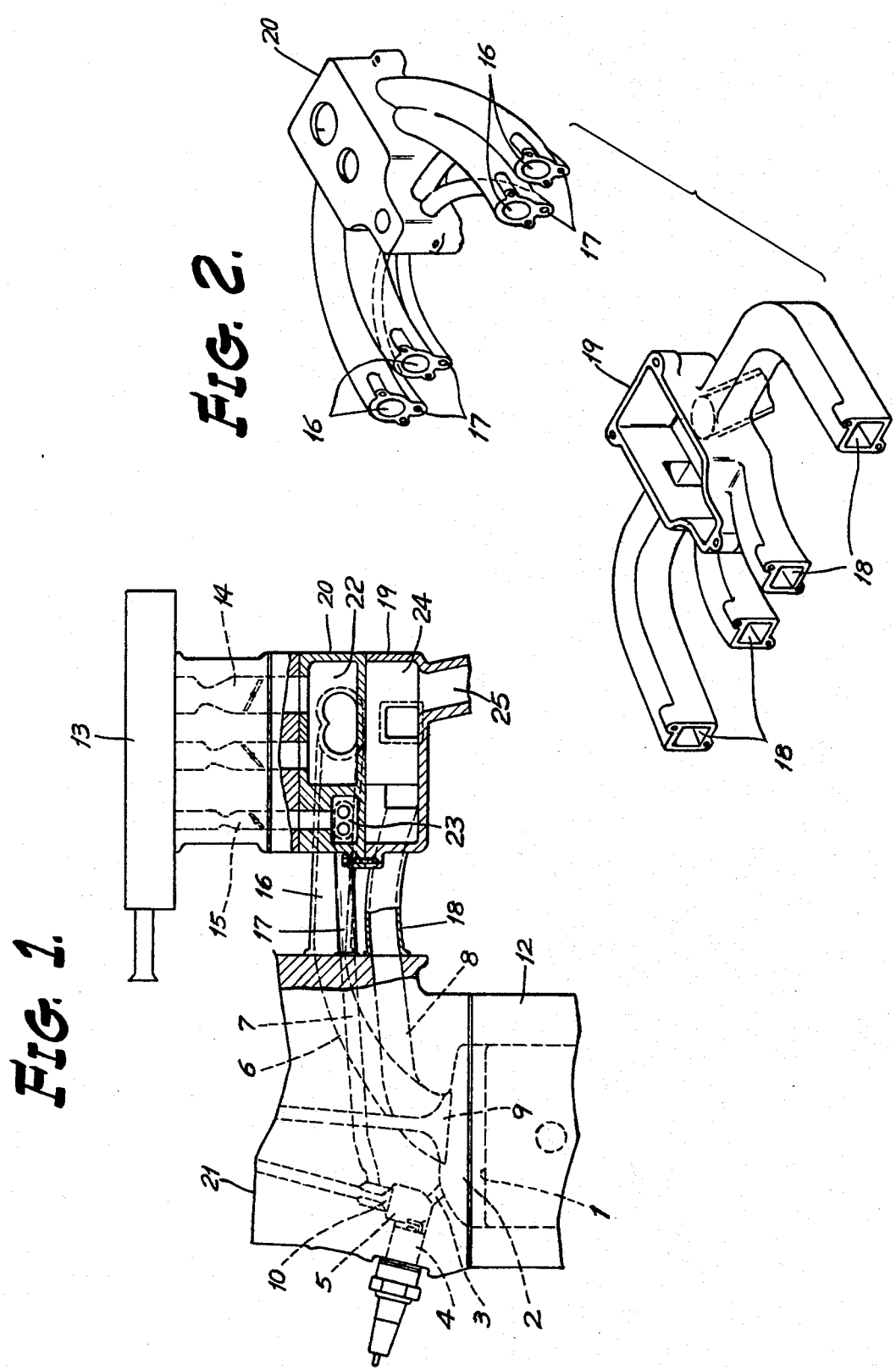

INTAKE MANIFOLD DEVICE OF AN INTERNAL COMBUSTION ENGINE

This invention relates to internal combustion engines having an auxiliary combustion chamber associated with each main combustion chamber. More particularly, this invention is directed to an improved intake manifold for controlling the relative temperature between the two intake mixtures.

Internal combustion engines of the type having an auxiliary combustion chamber associated with each main combustion chamber have been recognized for their ability to provide improved fuel economy and a relatively low level of emitted pollutants when compared with other forms of internal combustion engines. These engines include a system for introducing rich air-fuel mixture into the auxiliary combustion chamber and lean air-fuel mixture into the main combustion chamber. In order that the proper efficiency and emission cleanliness of the engine may be maintained, a control over the ratio of rich intake mixture to lean intake mixture must be effected. A first control over the ratio of rich to lean mixtures is provided by the relative sizes of each auxiliary combustion chamber and each main combustion chamber. However, this volume control does not make allowances for the variation in densities of the intake gases which is brought about by the variation in temperatures of the intake mixtures.

It has been found that the control of the temperature difference between the rich air-fuel mixture and the lean air-fuel mixture will bring about a control of the ratio of the amounts of intake regardless of the absolute temperatures of the rich and lean air-fuel mixtures. Control of this relationship has been effected by the presence of a heat transfer arrangement between the rich air-fuel mixture and the lean air-fuel mixture.

Accordingly, it is an object of the present invention to provide an internal combustion engine of the type employing an auxiliary combustion chamber with each main combustion chamber wherein the relative temperatures of the rich air-fuel mixture and the lean air-fuel mixture are controlled. Other and more detailed objects and advantages will appear hereinafter.

FIG. 1 is a sectional view of an internal combustion engine and an intake system embodying this invention.

FIG. 2 is an exploded assembly view of the intake and exhaust manifolds.

Referring to the drawings, one combustion chamber arrangement associated with the present invention is illustrated as comprising a main combustion chamber 2 and an auxiliary combustion chamber 5. The main combustion chamber 2 is formed within a cylinder in the engine block 12 immediately above a piston 1. A cylinder head 21 closes the upper portion of the chamber 2. The auxiliary combustion chamber 5 is located within the cylinder head 21 and is in communication with the main combustion chamber through a passageway or torch nozzle 3.

Respiration of the engine is provided by three valved ports. A lean air-fuel mixture is intermittently provided to the main combustion chamber 2 through a main intake passageway 6. Communication between the main intake passageway 6 and the main combustion chamber 2 is controlled by a main intake valve (not shown). air-fuel mixture rich air-fuelmixture is provided to the auxiliary combustion chamber 5 through an auxiliary intake passageway 7. A small auxiliary intake valve 10 controls the intake to the auxiliary combustion chamber 5. An exhaust valve 9 controls the discharging of the combusted gases from the main combustion chamber 2.

A spark plug 4 is positioned in the auxiliary combustion chamber 5 and is employed to initiate combustion. The rich air-fuel mixture present in the auxiliary combustion chamber 5 is ignited by the spark plug 4. A flame is thereby generated which projects into the main combustion chamber 2 through the torch nozzle 3. The introduction of the rich flame through the torch nozzle 3 acts to bring about ignition and combustion of the lean mixture within the main combustion chamber 2. This combustion sequence can be used to substantially improve the purity of the engine exhaust and to affect a corresponding reduction in the creation of air pollution.

Air is ingested through an air cleaner 13 and is then passed through a main carburetor 14 in route to the main combustion chamber 2 or through an auxiliary carburetor 15 in route to the auxiliary combustion chamber 5. The air-fuel mixture drawn from the main carburetor 14 is received by the intake manifold 20 in a main intake manifold chamber 22. This lean air-fuel mixture is then drawn through the main inlet manifold passageways 16 to the cylinder head 21. The air-fuel mixture drawn from the auxiliary carburetor 15 also passes into the intake manifold 20. The rich air-fuel mixture is drawn into the auxiliary intake manifold chamber 23 and is then passed through auxiliary intake manifold passageways 17 to the cylinder head 21.

The exhaust manifold 19 receives combusted gases from the exhaust passageways 8 through exhaust manifold conduits 18. The exhausted gases are passed into a main chamber 24 in the exhaust manifold 19 and then through exhaust pipe 25. The exhaust manifold 19 is constructed so that the exhaust manifold chamber 24 will lie directly beneath the intake manifold chambers 22 and 23. The exhaust manifold 19 is open above the exhaust chamber 24 and is designed to cooperate with the intake manifold 20 so that the bottom of the intake manifold 20 closes the exhaust chamber 24. In this way, a single wall is provided between the intake chambers 22 and 23 and the exhaust chamber 24 for maximum heat transfer. By placing the exhaust manifold chamber 24 in close thermal association with the intake manifold chambers 22 and 23, the incoming air-fuel mixtures are assured of being properly vaporized for introduction into the combustion chambers 2 and 5.

For maximum engine efficiency, it is advantageous that a specific ratio of rich air-fuel mixture to lean air-fuel mixture be provided to the combustion chambers 2 and 5. However, the relative temperatures of the two mixtures do not remain constant during engine operation. This relative temperature change affects the relative densities of the intake mixtures and consequently varies this preselected ratio of rich to lean air-fuel mixture. To control the ratio of rich to lean air-fuel mixtures in spite of the effect of the variations in temperatures on intake mixture density, the rich air-fuel mixture is placed in thermal association with the lean air-fuel mixture. This is accomplished by placing the main intake manifold chamber 22 and the auxiliary intake manifold chamber 23 together in the manifold 20. In this way, heat may be readily transferred from one to the other of the two chambers 22 and 23 through the through the common wall therebetween. This placement will tend to equalize the temperatures of the rich air-fuel mixture and the lean air-fuel mixture in order that a relative temperature balance may be maintained between the two air-fuel mixtures. Because the relative temperatures are controlled, the relative densities are also controlled. Consequently, the ratio of lean to rich mixtures will remain constant regardless of the operating temperatures of the engine.

Thus, an intake manifold system is disclosed which provides for heat transfer between the rich air-fuel mixture and the lean air-fuel mixture to preserve the specific mixture input ratio to the engine. Having fully described the preferred embodiment of the present invention, it is to be understood that the invention is not to be limited to the details herein set forth but is of the full scope of the appended claims.

What is claimed is:

1. In a multi-cylinder internal combustion engine having main combustion chambers each connected to an auxiliary combustion chamber through a torch opening, respectively, the improvement comprising, in combination: an exhaust manifold connected to receive exhaust gases from each main combustion chamber, an intake manifold having main intake conduits for connection with each main combustion chamber, said intake manifold also having auxiliary intake conduits for connection to each auxiliary combustion chamber, said intake manifold having a first chamber to receive a rich air-fuel mixture from a first carburetor, said intake manifold having a second chamber to receive a lean air-fuel mixture from a second carburetor, said auxiliary intake conduits communicating with said first chamber, said main intake conduits communicating with said second chamber, said exhaust manifold having an exhaust chamber in heat transfer relationship with said first and second chambers, said main intake conduits each being integrally associated adjacent said engine for heat exchange with one of said auxiliary intake conduits, respectively.

2. The device of claim 1 in which a single heat conductive wall exists between each main intake conduit and its associated auxiliary intake conduit.

* * * * *

UNITED STATES PATENT AND TRADEMARK OFFICE
CERTIFICATE OF CORRECTION

PATENT NO. : 3,895,617
DATED : July 22, 1975
INVENTOR(S) : Yoshitoshi Sakurai

It is certified that error appears in the above—identified patent and that said Letters Patent are hereby corrected as shown below:

Column 1, lines 65-66 should read --A rich air-fuel mixture is provided-- instead of "air-fuel mixture rich air-fuelmixture is provided".

Column 2, line 15, "affect" should read --effect--.

Column 2, last line, "through the" should be deleted (this is the second occurrence).

Signed and Sealed this fourteenth Day of October 1975

[SEAL]

Attest:

RUTH C. MASON
Attesting Officer

C. MARSHALL DANN
Commissioner of Patents and Trademarks